United States Patent [19]
Kuroki et al.

[11] Patent Number: 5,615,063
[45] Date of Patent: Mar. 25, 1997

[54] MAGNETORESISTIVE HEAD BIAS CURRENT SWITCHING BASED ON SKEW ANGLE

[75] Inventors: Kenji Kuroki, Fujisawa; Takao Matsui, Yamato, both of Japan

[73] Assignee: International Business Machines Corporation, Armonk, N.Y.

[21] Appl. No.: 445,513

[22] Filed: May 22, 1995

[30] Foreign Application Priority Data

May 23, 1994 [JP] Japan ................................. 6-108781

[51] Int. Cl.⁶ .............................. G11B 5/03; G11B 5/596
[52] U.S. Cl. .......................................... 360/66; 360/78.04
[58] Field of Search ................................ 360/66, 78.04, 360/46

[56] References Cited

U.S. PATENT DOCUMENTS 5,436,772  7/1995  Sekiya et al. ............................. 360/66
5,436,773  7/1995  Hanson ...................................... 360/66
5,461,517  10/1995  Suda et al. ............................... 360/53

Primary Examiner—W. C. Kim
Attorney, Agent, or Firm—Richard E. Billion; Owen J. Gamon

[57] ABSTRACT

A controller 40 of an HDC 30 is connected to a drive 28, and an arm is rotated through a predetermined angle. A magnetic head 20 on the arm comprises a recording element and a reproduction element. A bias current is supplied to the magnetic head 20 from the controller 40 through a driver 36A and a switching circuit 32A, and the magnetic field of the disk 18A is detected in a detector 38A through a switching circuit 32A. The switching circuit 32A inverts the polarity of a current applied to the magnetic head 20A, by a signal from the controller 40 corresponding to a skew angle. Accordingly, the direction of the bias magnetic field is changed, the effective sensitivity position of the reproduction element approaches the recording element, and off-track can be reduced.

19 Claims, 11 Drawing Sheets

| Cylinder number | Position control pattern | Sector number | Data |
|---|---|---|---|
FIG. 12
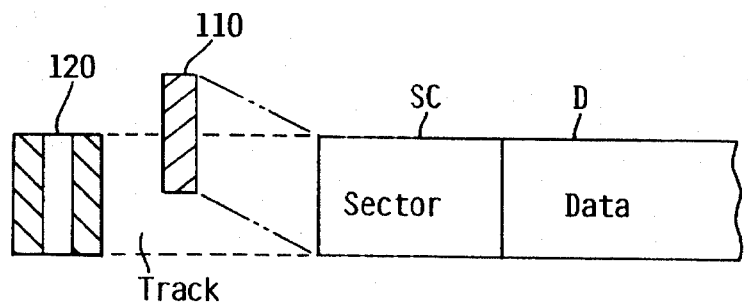
FIG. 13A
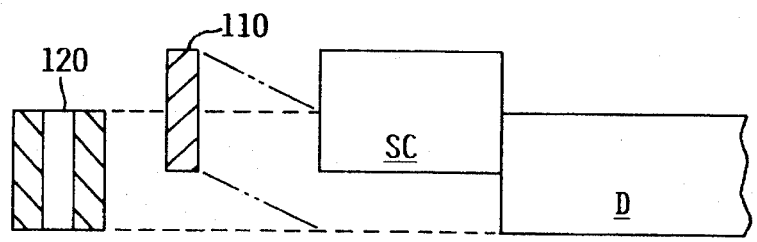
FIG. 13B
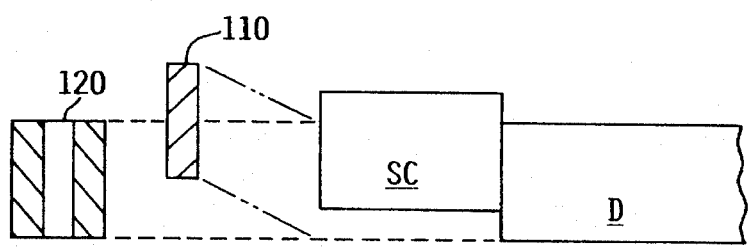
FIG. 13C

MAGNETORESISTIVE HEAD BIAS CURRENT SWITCHING BASED ON SKEW ANGLE

FIELD OF THE INVENTION

The present invention relates to a servo method and hard-disk system for a magnetoresistive (MR) head and, more particularly, to a servo method for positioning an MR head when information is reproduced with the MR head having a magnetoresistive effect and to a hard-disk system with the MR head.

BACKGROUND OF THE INVENTION

Hard-disk drives (hereinafter referred to as HDDs) have been put to practical use as an information recording medium for recording massive amounts of information used with computers, etc. This HDD has a plurality of magnetic recording disks (hereinafter referred to as disks), and information recording to the disk or information reading from the disk is performed by positioning a reproduction/recording head (hereinafter referred to as a magnetic head) over a desired tack on the disk.

In this HDD, a rotary actuator using a voice coil motor (VCM) has been widely used to position the magnetic head over a predetermined position on the disk, because the actuator is light-weight, high in rotation speed and low in cost. This rotary actuator has its axis of rotation outside the disk, and rotates the magnetic head on the fore end thereof and positions it over a predetermined position on the disk. A servo method is a sector servo method in which a pattern, a cylinder number, and a sector number needed for positioning control are recorded every sector of each disk surface. The sector servo method has been widely used in small HDDs.

HDD capacity has enlarged rapidly as processes in computers and the like have advanced. To promote increased HDD capacity, the reproduction/recording head must be small. The applicant of this application uses an MR head as a magnetic head for recording and reproducing information.

This MR head consists of an MR element with an MR effect as a reproduction element or write element, and an inductive thin-film head as a recording element. The reproduction element and the recording element are formed independently. As a matter of common knowledge, the MR element has a magnetoresistive effect in which a resistance value changes by a magnetic field or magnetization, and can detect a magnetic field near the MR element. When detecting a magnetic field by a change in a resistance value, the MR element requires a bias magnetic field to enhance its sensitivity and its linearity to a varying magnetic field. A shunt bias or a soft bias has been used as a general method for obtaining this bias magnetic field.

In the shunt bias, a conducting wire (i.e., one wire) is disposed parallel to the MR element, and a magnetic field produced by passing a current through this wire is applied to the MR element. That is, the shunt bias applies a bias magnetic field to an MR element vertical to the disk surface. Further, in the soft bias, a soft magnetic film is disposed parallel to a MR element, the soft magnetic film is magnetized by a magnetic field produced when a bias current for reproduction is applied to the MR element, and a bias magnetic field is applied to the MR element by the magnetic field of the soft magnetic film produced by that magnetization.

In a HDD, the MR element and the recording element do not always pass over the same track position. If, as shown in FIG. 11(A), it is designed that a rotary actuator (not shown) is rotated and an MR element 110 and a recording element 120 are positioned over nearly the same track at a predetermined position on the disk (e.g., near the innermost circumference of the disk), the region of reproducible track width $T_R$ will be contained in the region of a recordable track width $T_W$, because the recording element 120 is generally wider than the MR element 110. If, however, the rotary actuator is rotated toward the outer circumference of the disk, the MR element 110 and the recording element 120 will not pass over the same track, as shown in FIG. 11(B), because of a difference in skew angle and in position between the MR element 110 and the recording element 120 caused by rotation. That is, the region of the reproducible track width $T_R$ overlaps with only a portion of the region of the recordable track width $T_W$ and has a region that is not contained in the recordable track width $T_W$. Therefore, in the case that, as shown in FIG. 11(B), the MR element 110 and the recording element 120 do not pass over the same track, a servo control (microjogging) is required which changes the head position reproduction and recording.

The aforementioned sector servo method, however, has disadvantages when the sector number is reproduced. For example, if, as shown in FIG. 12, a cylinder number, a position control pattern, and a sector number and data recorded at the time of format and thereafter are contained in sectors, the sector number must be rewritten to stop using defective sectors and reproduced immediately before information reproduction or recording without discriminating them.

If information is recorded when, as shown in FIG. 13(A), a sector number was recorded on the same track as data and a sector region SC and a data region D are formed on the same track, the recording element 120 is controlled to be positioned over the track, so the MR element 110 is moved off-track to the sector region SC, and the sector number immediately before data is reproduced. However, when information is reproduced, the MR element 110 is controlled to be positioned over the track as shown by broken lines in FIG. 13(A). Therefore, the MR element 110 can be moved to the sector region SC without being off the track, and the sector number and data can be reproduced. Thus, the MR element 110 is greatly off from the track at reproduction of the sector number during information recording.

In addition, if, as shown in FIG. 13(B), the sector region SC and data region D were recorded so that the sector region SC is axially aligned with the MR element 110 and the data region D is axially aligned with the recording element 120, there is no problem in information recording. However, since the MR element 110 is positioned over the track, that is, over the data region D (as shown by broken lines in FIG. 13(B)) at information reproduction, the MR element 110 is moved to the sector region SC off-track and the sector number is read off-track.

To overcome the problem above, a constitution is proposed such that, as shown in FIG. 13(C), the sector region SC is recorded so that it is off the recording element 120 and the MR element 110 by an equal quantity and such that, even most off-track, the sector number can be reproduced half off-track (FIG. 13(A)) where the sector number was recorded on the same track as data.

As described above, if an MR head comprising recording and reproduction elements separate from each other is used in an HDD of the rotary actuator and sector servo type, the sector number must be reproduced off-track equivalent to a displacement of about 0.2 to 1.0 μm as an experimental value. In some cases, the sector number is not detected at all or is detected by mistake.

When the MR head is used in HDDs other than the servo sector type above, the track position during recording and track position during reproduction are also different because of a difference in skew angle and in position between the MR element 110 and the recording element 120 caused by the rotation of the MR head. Therefore, in some cases, the sector number is not detected or is detected by mistake, as in the case of the servo sector type.

In consideration of the facts above, an object of the present invention is to provide a servo method and a hard-disk system for an MR head which can reproduce information, making it possible to reduce cases in which information is not detected or is detected by mistake.

SUMMARY OF THE INVENTION

To achieve the above object in the servo method for a magnetoresistive (MR) head of the present invention, a servo method is used wherein the direction of said bias magnetic field applied to said reproduction element is changed in accordance with the relative position between said track and said reproduction element. When information is reproduced from the information recording disk, the reproduction element is positioned over a corresponding track. In the reproduction element with a magnetoresistive effect, the position at which the magnetoresistive effect is most sensitive moves depending on the direction of the bias magnetic field applied to the reproduction element. For this reason, the direction of the bias magnetic field applied to the reproduction element is changed in accordance with the relative position between the track and the reproduction element. Therefore, the position at which the magnetoresistive effect is most sensitive moves according to said relative position. Therefore, even if a displacement in position of the reproduction element occurs with respect to the track, the position at which the magnetoresistive effect is most sensitive moves according to this displacement, so defective reading of information is avoided.

Generally, said information recording disk is formed with a magnetic rotary disk, and this disk has a plurality tracks arranged along the circumference thereof. When the MR head is positioned over the information recording disk by a head holding means such as an arm having its axis of rotation at a position other than the center of the track, an angle defined by the head holding means and the track differs when comparing a track at the outer circumference, a track at the radial intermediate part, and a track at the inner circumference of the disk. Therefore, the position at which the magnetoresistive effect is most sensitive is controllably moved within the magnetoresistive head, in accordance with the relative position between the reproduction element and the track, so that no case occurs where defective reading of information varies between the inner and outer circumferences at which the MR head is positioned.

The direction of the bias magnetic field applied to the reproduction element is changed in accordance with the relative positioning between the track and the reproduction element and with the position of the radial direction in which the magnetoresistive head is positioned. Therefore, the position at which the magnetoresistive effect is most sensitive moves in accordance with said relative position. Even if a displacement in position of the reproduction element to the track, in the reproduction element the position at which the magnetoresistive effect is most sensitive would move, so defective reading of information is avoided. In addition, the position at which the magnetoresistive effect is most sensitive moves in accordance with a displacement in position of the reproduction element to the track over which the reproduction element is positioned, so that no case occurs where defective reading of information varies between the inner and outer circumferences at which the MR head is positioned.

In addition, the direction of the bias magnetic field applied to the reproduction element may be changed to either a first magnetic field direction or a second magnetic field direction in accordance with the relative position between the track and the reproduction element by determining the first magnetic field direction corresponding to a predetermined reference position relationship between the track and the reproduction element, and the second magnetic field direction different from the first magnetic field direction and corresponding to a predetermined position relation different from the reference position relationship, as a bias magnetic field applied to the reproduction element. This predetermined reference position relationship may, for example, be one where no displacement occurs in the position of the reproduction element to the track. If the predetermined reference position relationship is such, the direction of the reproduction element position displaced from this reference position is set to one direction and the second bias magnetic field direction is applied at a position relationship different from the reference position relationship, the position at which the magnetoresistive effect is most sensitive can be moved in accordance with a displacement of the reproduction element to the track, even if the reproduction element is displaced from the track. In addition, when information is reproduced from an information recording disk with a plurality of tracks in the radial direction, the average sensitivity of the magnetoresistive effect can be obtained over the entire region of movement in radial direction of the magnetoresistive head, if two regions are set for the movement in the radial direction of the magnetoresistive head to the information recording track, the first bias magnetic field is applied to the reproduction element in the one region, and the second bias magnetic field is applied to the reproduction element in the other region.

A bias current is commonly used to generate a bias magnetic field applied to said magnetoresistive head. Therefore, as described in claim 5, a bias current for applying a bias magnetic field to the reproduction element is supplied, and the direction of the bias magnetic field applied to the reproduction element may be changed by changing the polarity of the bias current. Therefore, the direction of the bias magnetic field applied to the reproduction element is determined by changing the polarity of said bias current in accordance with at least one of the relative positions between said track and said reproduction element and said position in the radial direction that the magnetoresistive head is positioned, and in the reproduction element, the position at which the magnetoresistive effect is most sensitive moves, so defective reading of information is avoided.

The reproduction element of said magnetoresistive head comprises a magnetoresistive effect element having a magnetoresistive effect and to which a bias current is supplied, and a magnetized element magnetized by the bias current supplied to the magnetoresistive effect element and applies a bias magnetic field to the magnetoresistive effect element by a magnetic field caused by the magnetization. A soft-bias magnetoresistive head can be used. In addition, the reproduction element of said magnetoresistive head comprises a magnetoresistive effect element with a magnetoresistive effect, and a magnetic field application element to which a bias current is supplied and which applies a bias magnetic field to the magnetoresistive effect element by the supplied bias current. A shunt-bias magnetoresistive head can be used.

The magnetoresistive head comprises a magnetoresistive head including a reproduction element having a magnetoresistive effect and for reproducing information with a bias magnetic field applied to the element and with the magnetoresistive effect, and a recording element for recording information. With this magnetoresistive head, when information is reproduced from an information recording disk having tracks with a plurality of information record reproduction regions, the reproduction element is positioned over a corresponding track by a positioning means. The magnetic field direction change means changes the direction of the bias magnetic field applied to the reproduction element, in accordance with the relative position between the track and the reproduction element. In addition, the positioning means of the hard-disk system positions the reproduction element over a corresponding track when information is reproduced from an information recording disk having a plurality of tracks with a plurality of information record reproduction regions arranged in a radial direction, by the magnetoresistive head. The magnetic field direction change means changes the direction of the bias magnetic field applied to the reproduction element, in accordance with the position of the radial direction in which the magnetoresistive head is positioned. Further, the position means of the hard-disk system positions the reproduction element over a corresponding track when information is reproduced from an information recording disk having a plurality of tracks with a plurality of information record reproduction regions arranged in a radial direction, by the magnetoresistive head. The magnetic field direction change means changes the direction of the bias magnetic field applied to the reproduction element, in accordance with the position of the radial direction in which the magnetoresistive head is positioned and with the position of the radial direction in which the magnetoresistive head is positioned.

In hard-disk systems, the magnetic field direction change means determines a first magnetic field direction corresponding to a predetermined reference position relationship between the track and the reproduction element, and a second magnetic field direction different from the first magnetic field direction and corresponding to a predetermined position relationship different from the reference position relationship, as a bias magnetic field applied to the reproduction element, and can change the direction of the bias magnetic field applied to the reproduction element, between the first magnetic field direction and the second magnetic field direction.

In addition, in hard-disk systems as described above, said reproduction element may comprise a magnetoresistive effect element having a magnetoresistive effect and to which a bias current is supplied, and a magnetized element magnetized by the bias current supplied to the magnetoresistive effect element and applies a bias magnetic field to the magnetoresistive effect element by a magnetic field caused by magnetization. In addition, said reproduction element may comprise a magnetoresistive effect element with a magnetoresistive effect, and a magnetic field application element to which a bias current is supplied and which applies a bias magnetic field to the magnetoresistive effect element by the supplied bias current.

BRIEF DESCRIPTION OF THE DRAWINGS

FIG. 12 shows a sectored track format;

FIG. 13(A) is an image diagram explaining production of the sector number by a sector servo method, sector and data regions being formed on the same track;

FIG. 13(B) is a diagram similar to FIG. 13(A) but showing the sector and data regions recorded so that the sector region is axially aligned with the reproduction element and the data region is axially aligned with the recording element; and FIG. 13(C) is a diagram similar to FIG. 13(A) but showing the sector region recorded off the recording and reproduction elements an equal amount.

DETAILED DESCRIPTION OF THE PREFERRED EMBODIMENT

An embodiment of the present invention is hereinafter be described in detail in conjunction with drawings. This embodiment is applied to a HDD 10 that positions a magnetic head over a magnetic recording disk by a sector servo method.

Figure 2:
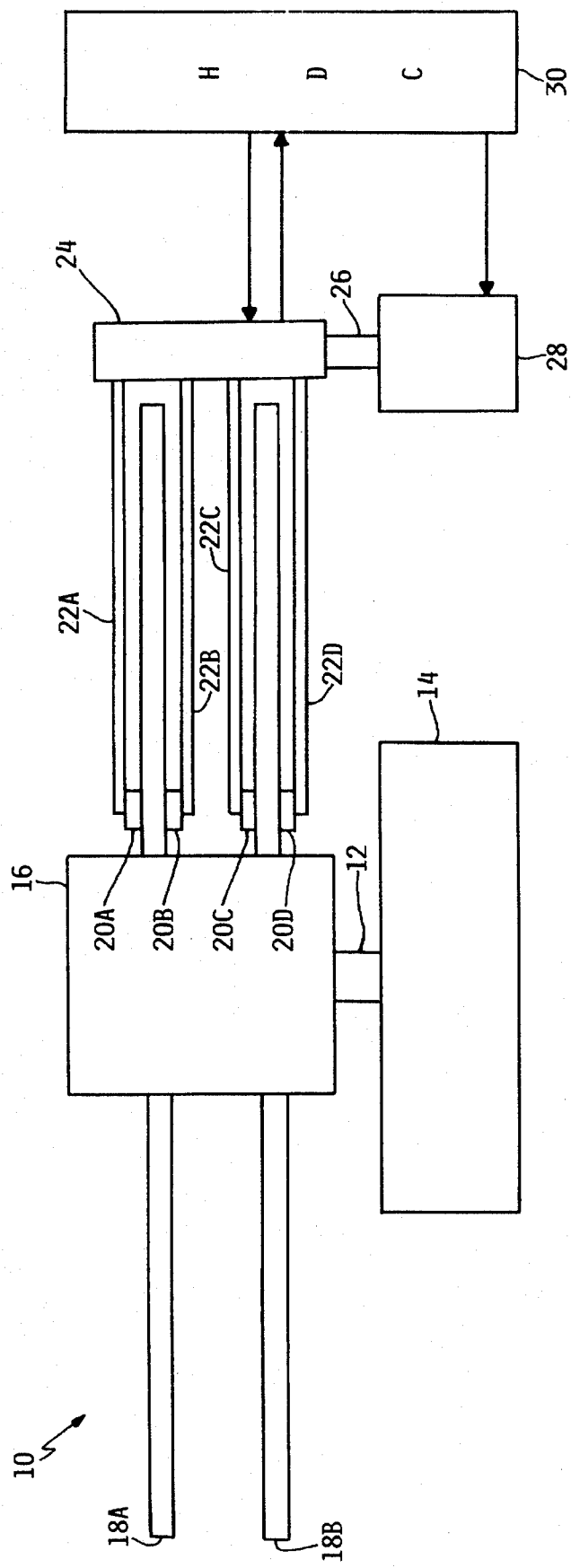
FIG. 2 is a block diagram showing the HDD to which the present invention may be applied.

As shown in FIG. 2, the HDD 10 according to the embodiment of the present invention has a drive 14 that drives a shaft 12 to rotate at high speeds. A cylindrical support 16 is installed on the shaft 12 so that the axes thereof are vertically aligned with each other. A plurality of disks 18A and 18B (in this embodiment, two) is installed at predetermined spaces on the outer periphery of the cylindrical support 16. Each disk 18A and 18B, which have a predetermined thickness, is made of a hard material and coated on both sides with a magnetic material, and both sides of the disk are used as a recording surface. Each of the disks 18A and 18B is formed at the central portion thereof with an aperture that is almost the same as the outer diameter of the cylindrical support 16. The cylindrical support 16 is inserted into the apertures and the disks 18A and 18B are installed and fixed on the support 16. Therefore, when the shaft 12 is rotated by the drive 14, the disks 18A and 18B and the support 16 will be rotated as a single body.

Figure 3:
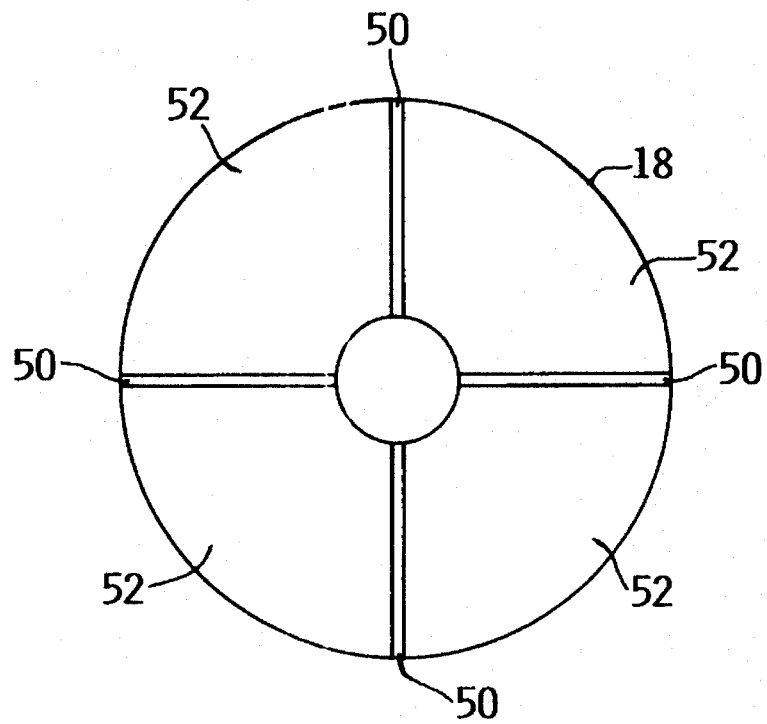
FIG. 3 is a diagram showing the recording surface of the disk of the HDD.

Disks 18A and 18B are formed on each recording surface with a plurality of servo regions 50 extending in the radial direction and a plurality of data track regions 52 each disposed between two adjacent servo regions 50, as shown in FIG. 3. A servo signal such as a burst pattern for representing the array direction and the like for the data track is recorded on the servo region 50. For the data track, a special code (e.g., nonsignal region of about 1 µs) for representing the start of a pattern, and a gray code (cyclic binary code) for representing the address and the like of each data track are also recorded in the servo region 50. Note that information for generating a sector pulse signal representing the end of the servo region 50 (start of the sector) is recorded at the end of the servo region 50 in the rotary direction. A plurality of data tracks is concentrically formed at a pitch P in the radial direction in the data track region 52, and data is written to each data track in the direction of disk 18A and 18B rotation by a magnetic head to be described hereinafter.

Figure 1:
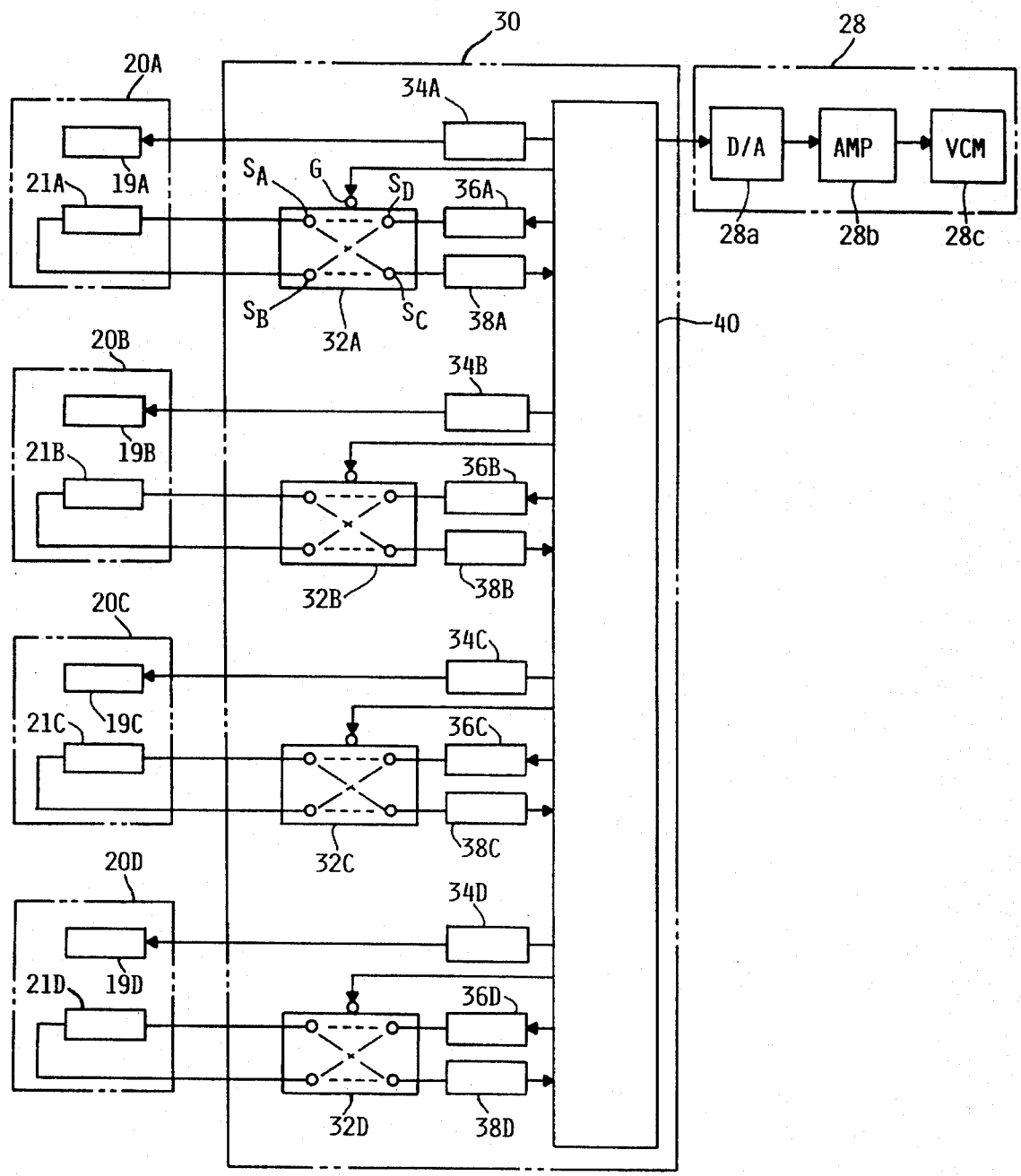
FIG. 1 is a schematic view showing the peripheral equipment of the hard-disk controller of a hard-disk drive (HDD) to which the present invention may be applied.

The aforementioned HDD 10 includes magnetic heads 20A and 20B with a predetermined head gap width and gap length disposed over recording surfaces of the disk 18A, and magnetic heads 20C and 20D at a predetermined head gap width and gap length disposed over the recording surfaces of the disk 18B. As shown in FIG. 1, magnetic heads 20A to 20D function as magnetoresistive and include reproduction elements 21A to 21D for reading information and recording elements 19A to 19D for writing information. Magnetic heads 20A to 20D are supported at one end of the access arms 22A to 22D so that they are spaced a predetermined distance (e.g., about 0.1 to 0.2µ) from the recording surfaces of the disks 18A and 18B. Access arms 22A to 22D are on a support member 24 placed at their other end. The support member 24 is connected to a drive 28 through a shaft 26. If the drive 28 rotates through a predetermined angle, access arms 22A to 22D rotate. By the rotation of access arms 22A to 22D, magnetic heads 20A to 20D are moved in the radial direction over the recording surfaces of the disks 18A and 18B and positioned over positions on the recording surfaces of the disks 18A and 18B.

The head drive 28 is connected to a hard-disk controller (hereinafter, HDC) 30. This HDC 30 is connected to each of the magnetic heads 20A to 20D, as shown in FIG. 1.

As shown in FIG. 1, the HDC 30 has a controller 40. The controller 40 is connected to a drive 28 comprising a digital analog (D/A) converter 28a, an amplifier (AMP) circuit 28b, and a voice coil motor (VCM) 28c. Therefore, a digital signal output by the controller 40 is converted to an analog signal in the D/A converter 28. In the AMP 28b, the analog signal is then amplified by a predetermined scale factor. The amplified signal is supplied to the VCM 28c. The VCM 28c rotates by a predetermined angle based on the supplied signal, so that access arms 22A to 22D are rotated through the predetermined angle.

The controller 40 is also connected to the recording element 19A of the magnetic head 20A through a driver 34A for supplying a current for information recording. The controller 40 is further connected to the reproduction element 21A of the magnetic head 20A through a driver 36A for supplying a bias current, a detector 38A for detecting a magnetic field corresponding to information recorded on the disk, and a switching circuit 32A. More particularly, the controller 40 is connected to the terminal $S_D$ of the switching circuit 32A through the driver 36A and to the terminal $S_C$ of the switching circuit 32A through the detector 38A. This switching circuit 32A has a control terminal G connected to the controller 40. The switching circuit 32A switches a path of two circuits passing therethrough, and is set so that terminals $S_A$ and $S_D$ are connected and terminals $S_B$ and $S_C$ are connected, when a low-level signal is input to the control terminal G. However, if a high-level signal is input to the control terminal G, terminals $S_A$ and $S_C$ are connected and terminals $S_B$ and $S_D$ are connected. Terminals $S_A$ and $S_B$ of the switching circuit 32A are connected to the opposite ends of the reproduction element 21A. Note that switching circuits 32A to 32D can be constituted by H bridge circuits, etc.

Likewise, the controller 40 is connected to recording elements 19B to 19D of the magnetic head 20B to 20D through drivers 34B to 34D, and is connected to reproduction elements 21B to 21D of the magnetic head 20B to 20D through drivers 36B to 36D, detectors 38B to 38D, and switching circuits 32B to 32D.

The magnetic head 20A functions as a magnetoresistive head, but the reproduction 21A and recording 19A elements are formed separately. In the recording element 19A, the inductive thin film is formed by sputtering. Further, the reproduction element 21A includes an element with a magnetoresistive effect (MR effect) wherein an electric resistance value varies by a magnetic field or magnetization. In the embodiment of the present invention, by the reproduction element 21A, sensitivity and linearity in a varying magnetic field as the magnetic field is detected by variation in a resistance value caused by a bias magnetic field applied by a soft bias are enhanced, when a magnetic field near the reproduction element is detected. Since the magnetic heads 20B to 20D are the same constitution as the magnetic head 20A, only the magnetic head 20A will hereinafter be described and a detailed description of the magnetic heads 20B to 20D will not be given.

Figure 4:
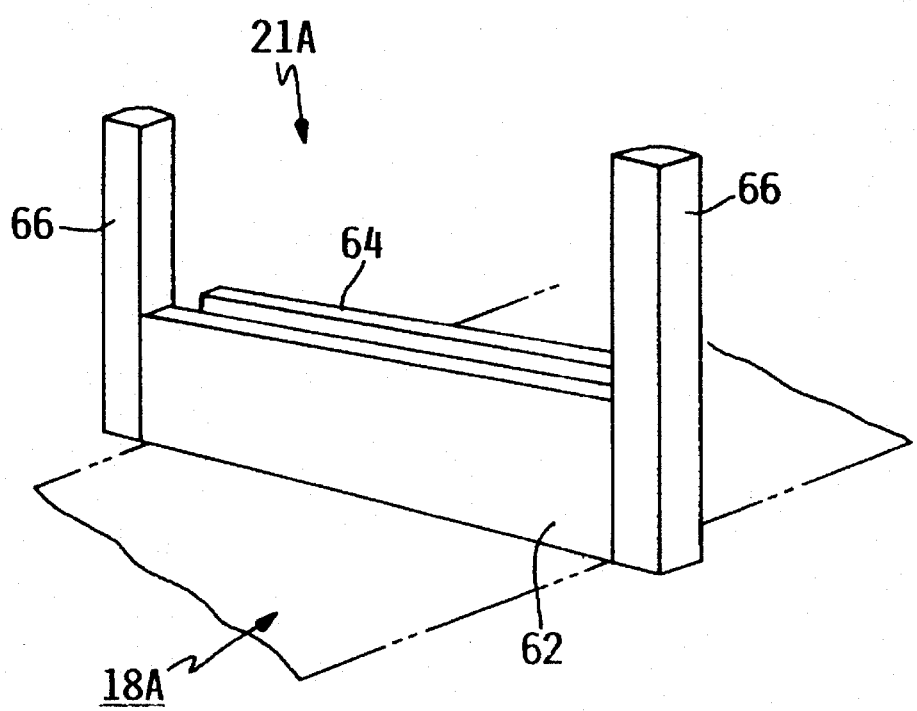
FIG. 4 is a perspective view of a soft bias reproduction element.

As shown in FIG. 4, the reproduction element 21A comprises a generally plate-shaped MR element 62 with an MR effect, and a soft adjacent layer (SAL) 64 made of a soft magnetic material. The both ends of MR element 62 are connected to the HDC 30 through lead wire 66. The SAL 64 is stacked parallel to the MR element 62, and the MR element 62 and SAL 64 are horizontal with respect to the disk 18A. Since the SAL 64 is made of a soft magnetic material, it is magnetized by a current supplied to the MR element 62. Using the magnetic field of the SAL 64 caused by that magnetization, a bias magnetic field is applied to the MR element 62.

Figure 5:
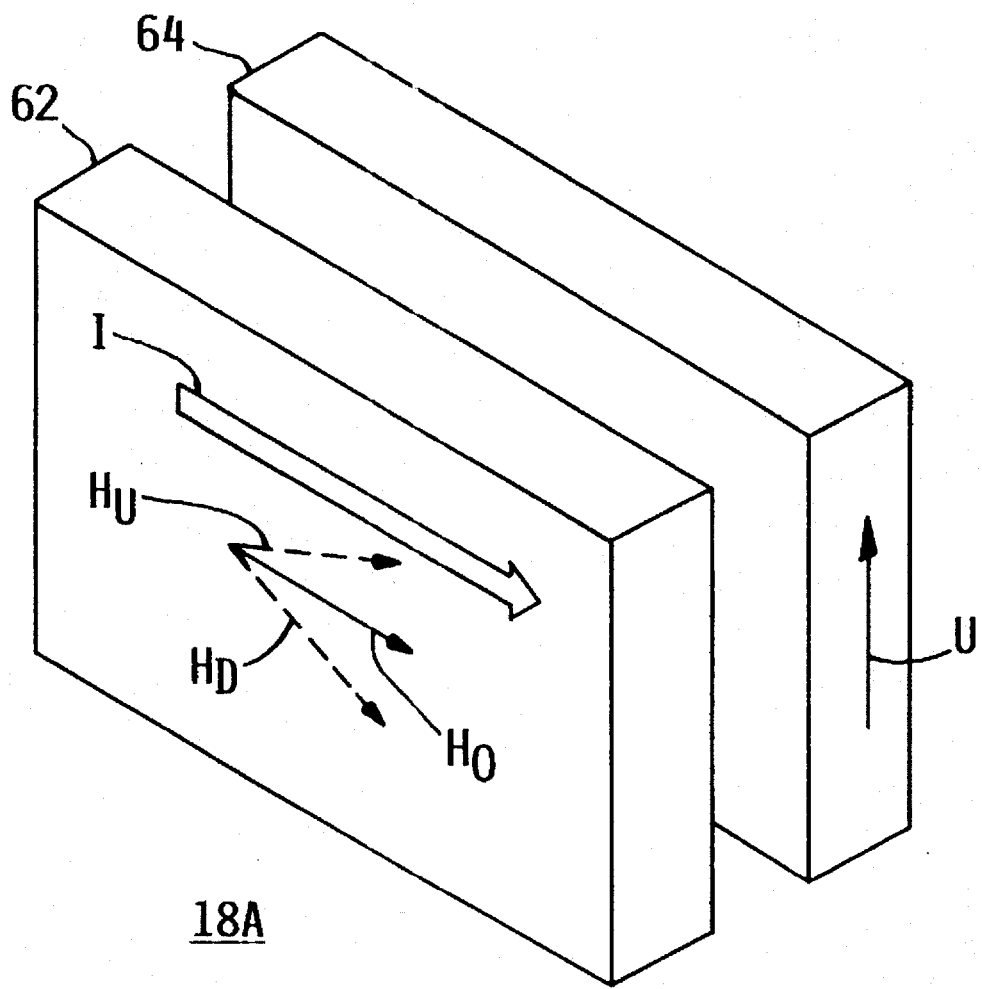
FIG. 5 is a diagram explaining a bias magnetic field in the reproduction element.

Next, the operation of the embodiment of the present invention is described in conjunction with the function of the reproduction element. As shown in FIG. 5, when current is not supplied to the MR element 62 of the reproduction element 21A, the SAL 64 is not magnetized, so the direction of the magnetization vector is direction $H_O$ at manufacture. If a predetermined current is supplied as a bias current to the MR element in a predetermined direction I, a vertical magnetic field in a predetermined direction U will occur in the SAL 64 by the predetermined current supplied to the MR element 62. This magnetic field of the SAL 64 is applied as a bias magnetic field to the MR element 62, so the direction $H_O$ of the magnetization vector fluctuates in the direction indicated by an arrow $H_D$ in FIG. 5.

If, however, the direction (polarity) of the current supplied to the MR element 62 is inverted (direction opposite direction I), a vertical magnetic field in the opposite direction to the direction U will occur in the SAL 64. Therefore, the direction $H_O$ of the magnetization vector in the MR element 62 fluctuates in the direction $H_u$ opposite the direction $H_D$.

Figure 6A:
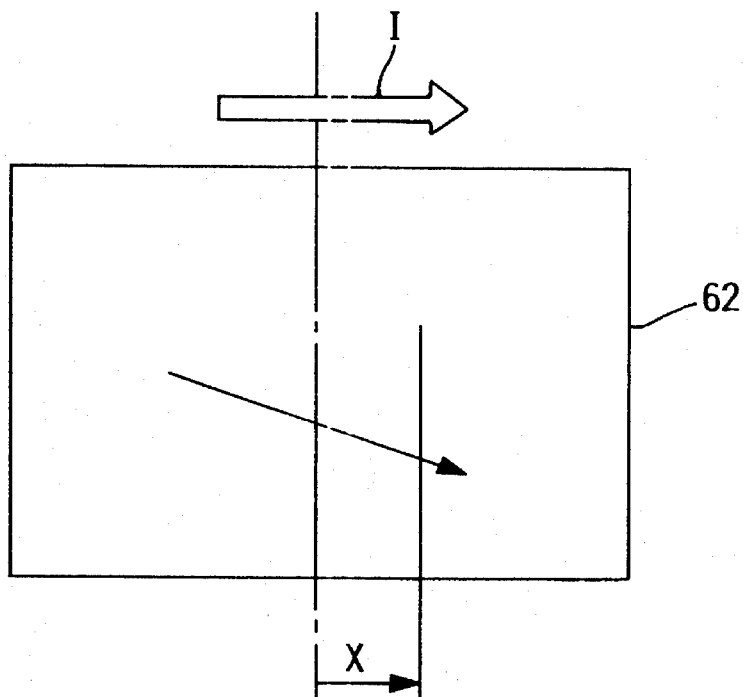
FIG. 6(A) is a diagram used explaining how a magnetic field in a magnetoresistive element fluctuates by a bias current in a predetermined direction.
Figure 6B:
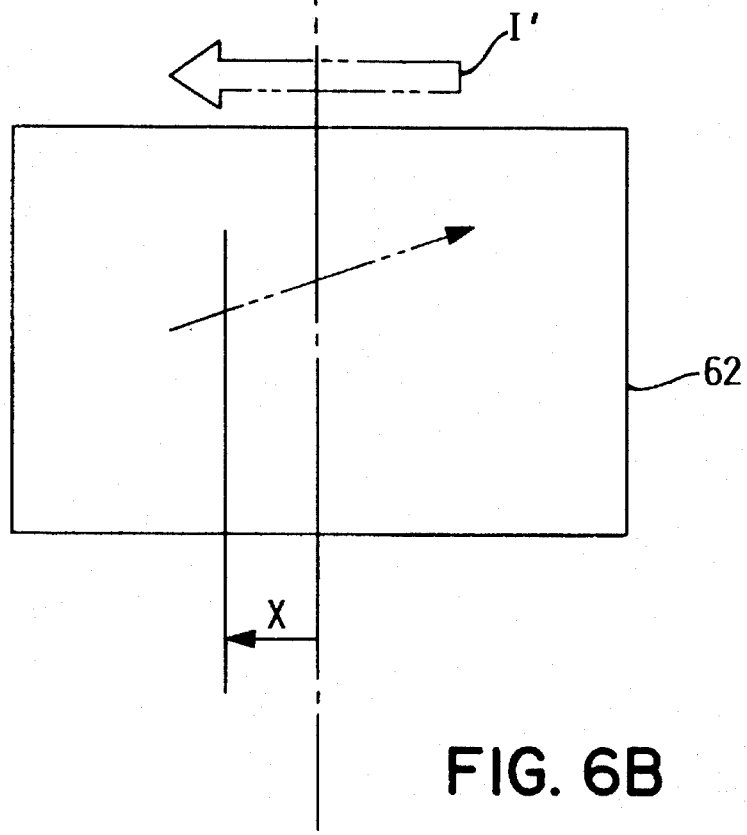
FIG. 6(B) is a diagram explaining how the magnetic field in the magnetoresistive element fluctuates by a bias current in a direction opposite the predetermined direction.

Therefore, since the direction of the vertical magnetic field applied to the MR element 62 by the SAL 64 is inverted, the direction of the magnetization vector in the MR element 62 fluctuates in the direction $H_U$ or $H_D$, depending on the direction of the bias current supplied to the MR element 62. By the direction $H_U$ or $H_D$ of the magnetization vector, the magnetic center moves from the geometric center. That is, if, as shown in FIG. 6(A), the bias current is supplied in a predetermined direction I to the MR element 62, the detection of magnetic field fluctuation becomes sensitive on the right in FIG. 6, and the center of sensitivity moves from the geometric center to the right in FIG. 6. If, however, the bias current is applied in the opposite direction I' to the MR element 62, the detection of magnetic field fluctuation becomes sensitive on the left in FIG. 6, and the center of sensitivity moves from the geometric center to the left in FIG. 6. Supplying a bias current in a predetermined direction I substantially the same as the direction of the magnetization vector in the MR element 62 is called a negative bias (FIG. 6(A)). Supplying a bias current is supplied in the opposite direction I' is called a positive bias (FIG. 6(B)).

In the magnetization vector by the direction $H_U$ or $H_D$, the magnetization of the MR element 62 shifts up and down by the vertical component of the magnetic field that occurs from the disk 18A (according to data recorded on the disk 18A) and is detected as a resistance change. The sensitivity of detection can be expressed by a bathtub curve, and the center of the bathtub curve is displaced about 0.2 to 0.7 μm from a geometrical position. Therefore, this displacement depends upon the direction of the magnetization vector of the MR element 62.

Figure 7:
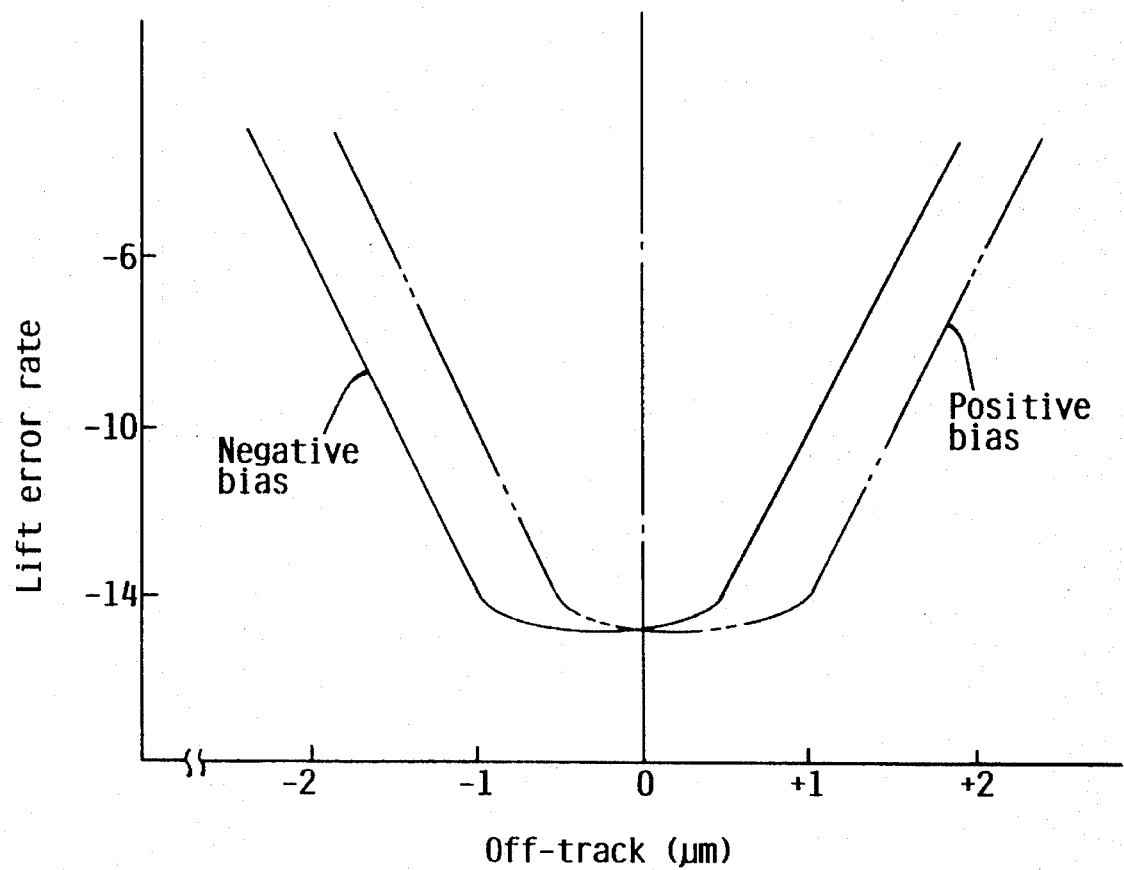
FIG. 7 is a characteristic diagram showing the relationship between the off-track amount and an error rate in accordance with a bias magnetic field.

In the MR element 62 of the embodiment of the present invention, a magnetically central position (effective track position) is set so that it moves ±0.4 μm with respect to a magnetic center. Therefore, between a bias current supplied in direction I in FIG. 5 (negative bias) and a bias current supplied in the opposite direction (positive bias), the magnetization vector directions of the negative and positive biases in the MR element 62 vary so that they are reflected images, as shown in FIG. 7. As a result, the bathtub center of the positive bias and the bathtub center of the negative bias become symmetrical for off-track 0.

Referring to the flowchart of FIG. 9, a change in a bias magnetic field applied to the MR element at information reproduction is hereinafter described. Assume that the range of rotation angle at which the magnetic head 20A can move over the recording surface of the disk 18A is 20°. Also, assume that the offset between the reproduction element 21A and the recording element 19A is 0.8 μm at a maximum skew angle of 20°.

Figure 9:
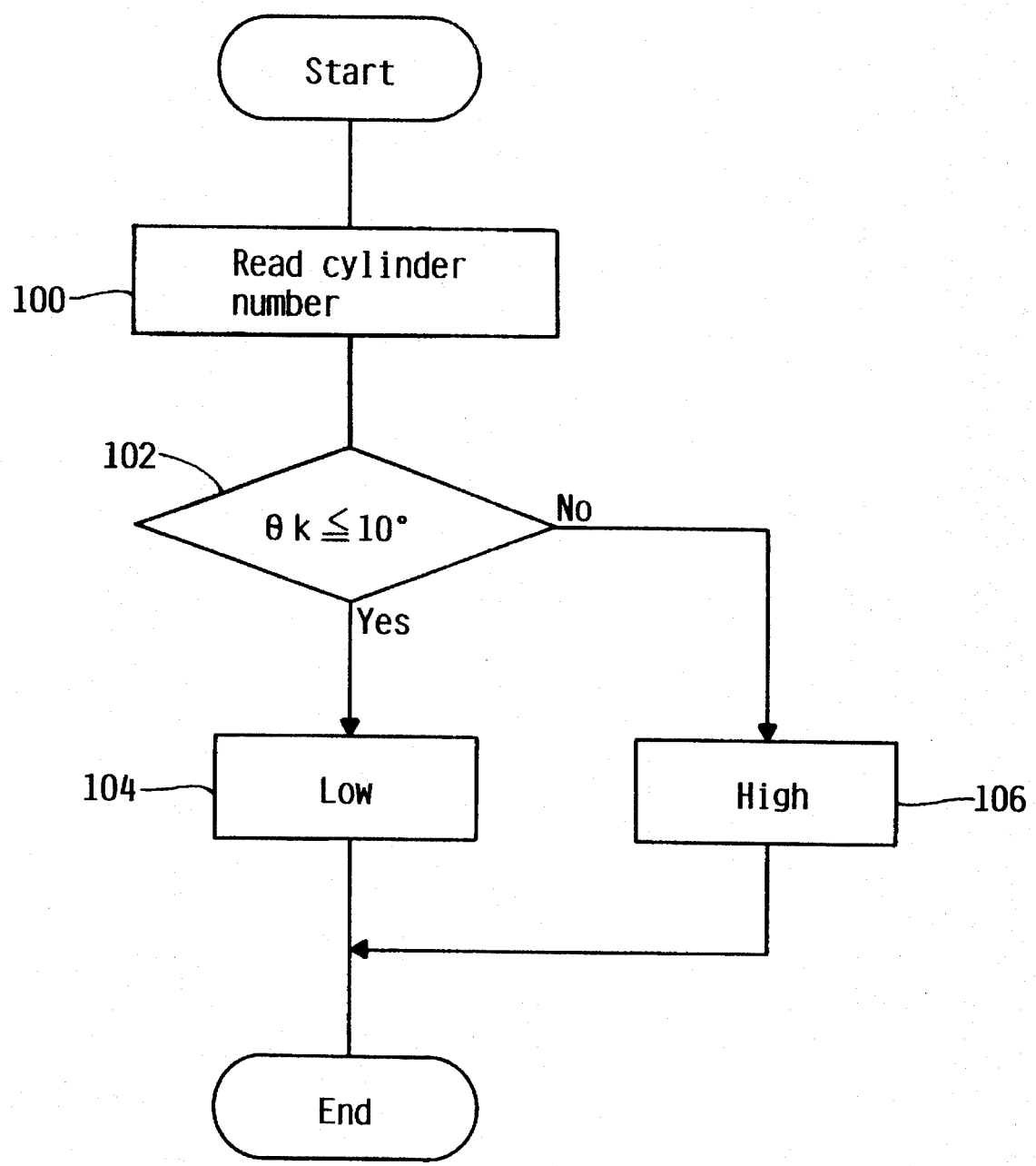
FIG. 9 is a flowchart showing the steps in which the polarity of a bias current for applying a bias magnetic field in a different direction is inverted.

In step 100 of FIG. 9, a cylinder number is read that corresponds to the radial position of the disk, so a skew angle $\Theta_K$ can be calculated from the read cylinder number. This cylinder number can also be obtained from the position of the magnetic head 20A over the disk 18A by a disk seek instructed from a host computer, etc. Also, the cylinder number can be determined from a predetermined table stored in the HDD 10. In step 102, it is determined if $\Theta \leq 10°$. If YES, in step 104 the skew angle is determined to be low.

A low-level signal is output to the switching circuit 32A, and the routine is complete. Therefore, a bias current in a predetermined direction (direction I of FIG. 5) is supplied to the MR element 62 and a bias magnetic field is applied from the SAL 64 to the MR element 62, so the magnetization vector direction of the MR element 62 changes from the direction $H_O$ of FIG. 5 at manufacture to the direction $H_D$ of FIG. 5.

If, however, it is determined in step 102 that the skew angle Θ exceeds 10°, step 102 goes to step 106. In step 106, the skew angle is determined to be high. A high-level signal is output to the switching circuit 32A, and the routine is complete. Therefore, the direction (polarity) of the bias current supplied to the MR element 62 is inverted opposite the direction I in FIG. 5 and a bias magnetic field in the opposite direction is applied from the SAL 64 to the MR element 62, so the magnetization vector direction of the MR element 62 changes to the opposite direction $H_U$ in FIG. 5.

Therefore, at a skew angle of 10°, the magnetic center of the MR element 62 moves from the geometrically central position of the MR element 62 (FIG. 6). For this reason, the center of sensitivity in the detection of a fluctuation or change in a magnetic field is moved from the geometric center.

Therefore, if the skew angle $\Theta_K$ varies from 0° to 20°, a characteristic 72 is obtained in which a characteristic from 0° to 10° and a characteristic from 10° to 20° are almost identical, because, in the HDD 10 of the embodiment of the present invention, the magnetically central position of the MR element 62 is changed at the skew angle $\Theta_K=10°$. Since a conventional HDD is set so that an absolute value of offset becomes the minimum, the relationship between offset and the skew angle becomes linear 70 and an offset fluctuates ±0.8 μm about the skew angle $\Theta_K=10°$. Therefore, the reproduction element reduces the maximum offset from a conventional 0.8 μm to 0.4 μm by inverting the bias current direction (polarity). For this reason, in a constitution such as that of FIG. 13(C) in which a sector region SC is recorded so that it is off the recording element 120 and the MR element 110 by an equal quantity and off-track is minimized, off-track can be reduced to 0.4 to 0.2 μm when the sector number is reproduced.

As described above, since in the embodiment of the present invention the center of sensitivity in the detection of a fluctuation in a magnetic field can be changed by changing the direction of the magnetic field when a bias magnetic field is applied to an MR head, the off-track caused by space between the recording element and the reproduction element can be reduced when the sector number, which is inevitable in an HDD of the rotary actuator and sector servo type, is reproduced from such as an ID field.

Therefore, the region for reproducing a sector number used in both information recording and reproduction need not be widened in the radial direction of a disk, so the radial width of tracks on the disk can be narrowed and recording density enhanced.

While the embodiment of the present invention has been described assuming that the distribution of tracks that a disk has is substantially identical between disks, some cases occur where a distribution occurs in the track positions of the recording and reproduction elements because of assembly accuracy for stacked disks and for magnetic heads to access arms. The recording and reproduction elements also have a certain fluctuation caused by mask alignment and etching accuracy, because element positions are determined by photolithography.

Figure 8:
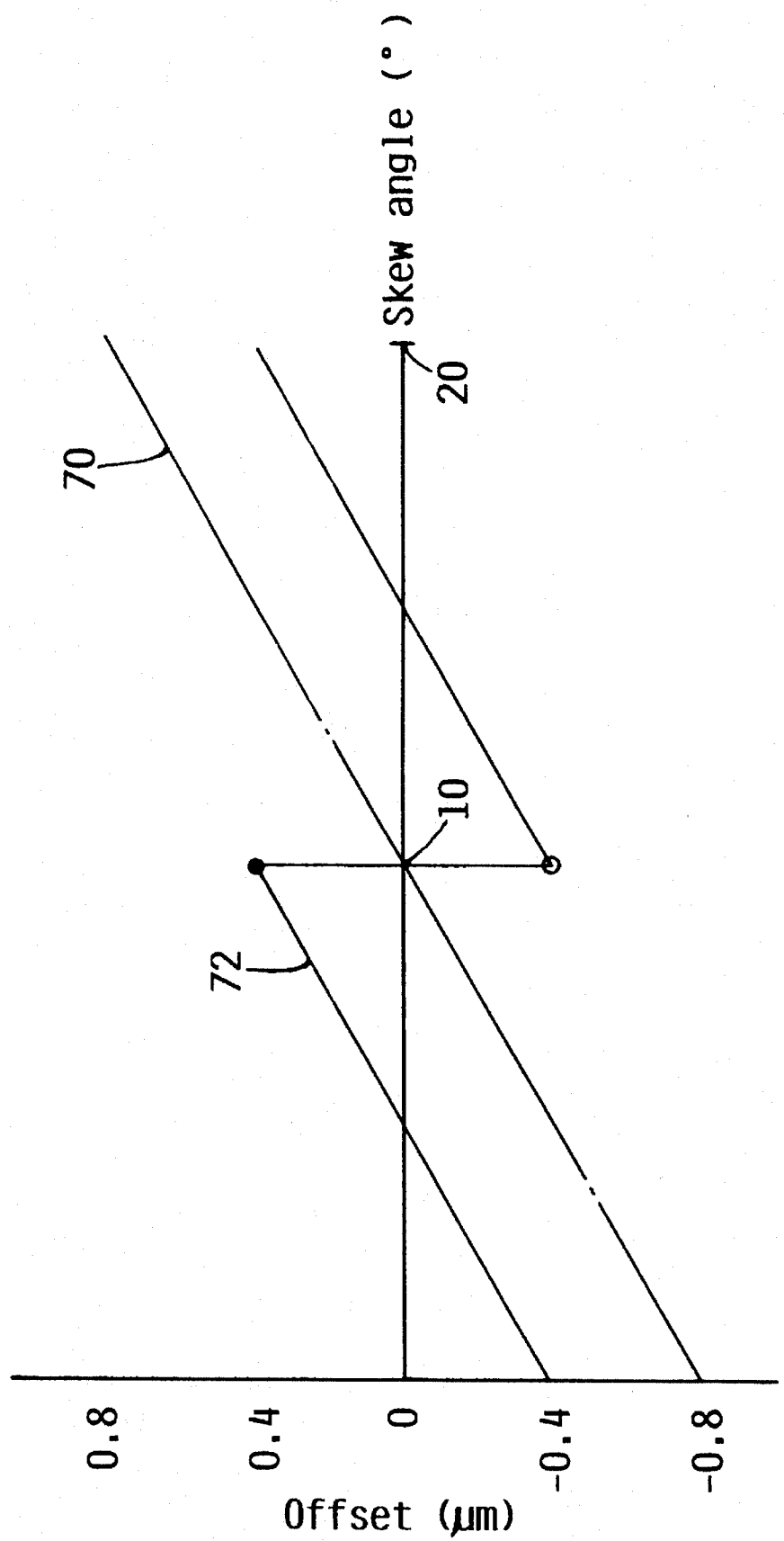
FIG. 8 is a characteristic diagram showing the relationship between a skew angle and the offset amount.

Therefore, if, as in the aforementioned embodiment, the direction (polarity) of a bias current applied to reproduction elements 21A to 21D of the magnetic heads 20A to 20D is changed only along the characteristic 72 of FIG. 8, the maximum value of offset of the recording and reproduction elements is increased by the amount of fluctuation.

The time the direction (polarity) of a bias current is changed thus must be set for each magnetic head. That is, a high-level or low-level signal must be output to switching circuits 32A to 32D (FIG. 1) at the time corresponding to magnetic heads 20A to 20D.

Figure 10:
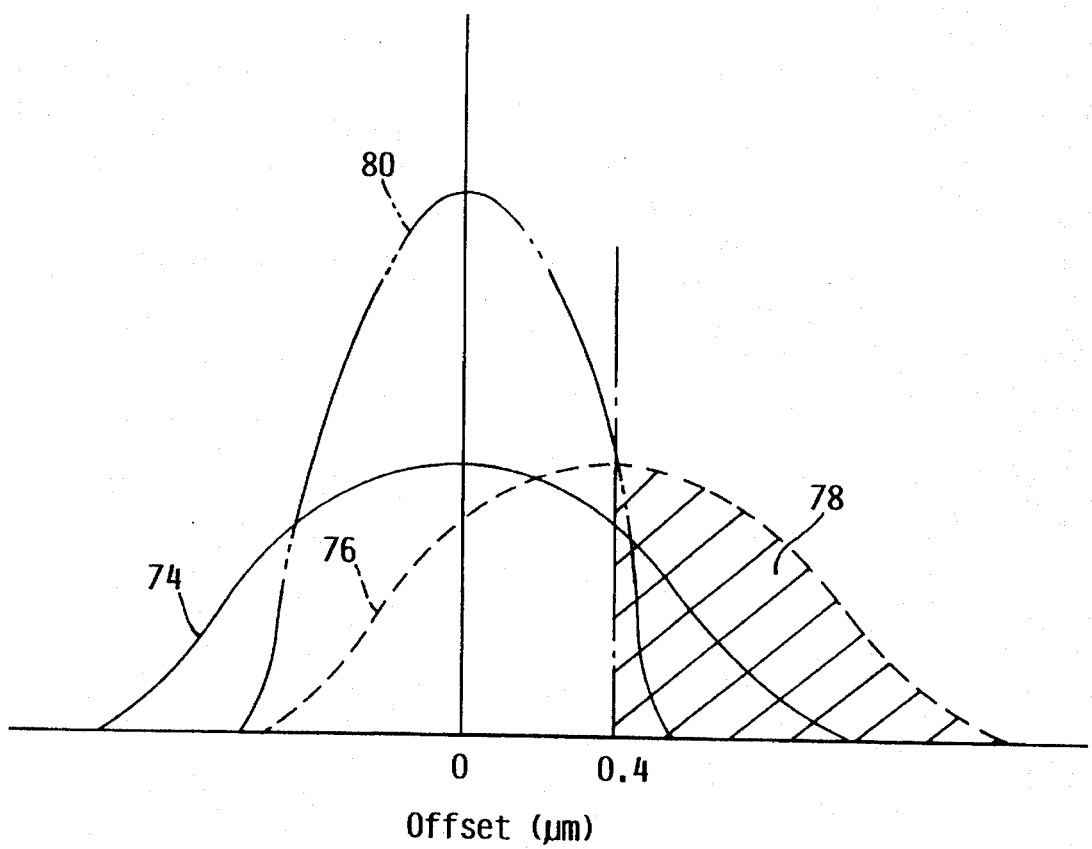
FIG. 10 is a characteristic diagram showing the offset distribution of a magnetic head.
Figure 11A:
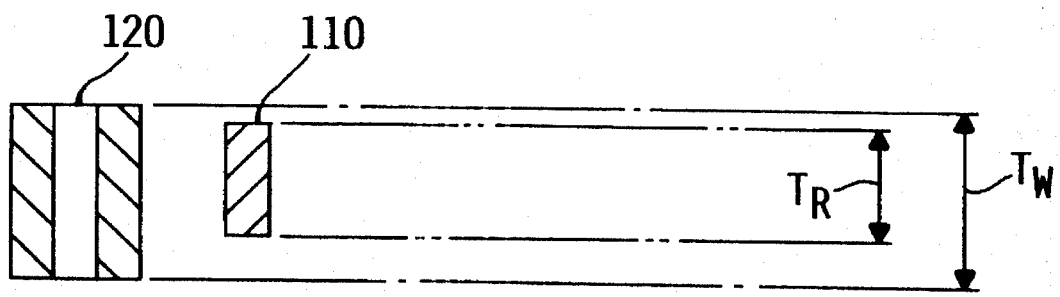
FIG. 11(A) shows the relationship between a recording element and a reproduction element when the magnetic head is rotated near the innermost circumference of the disk.
Figure 11B:
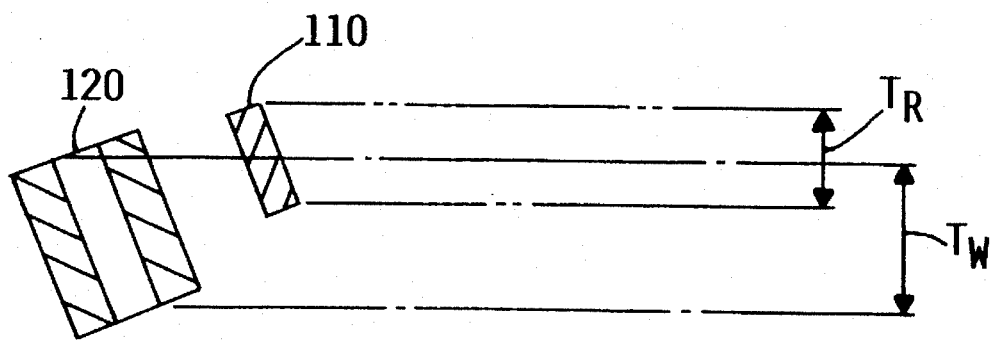
FIG. 11(B) shows the relationship between the recording element and the reproduction element when the magnetic head is rotated toward the outer circumference of the disk.

As shown in FIG. 10, if, for magnetic heads 20A to 20D having a distribution in offset of the recording and reproduction elements, the relationship between the skew angle and offset is determined so that a target is set so that an absolute offset becomes minimum (characteristic 70 of FIG. 8), the distribution of offset for all magnetic heads 20A to 20D becomes a characteristic 74. If the relationship between the skew angle and offset is determined so that a target is set to a position different by about 0.4 μm from the relationship between the skew angle and the offset of the characteristic 74, a distribution of offset for all magnetic heads 20A to 20D will become a characteristic 76.

If, in the setting of a target by the characteristic 76, the bias current of the magnetic head in a region 78 (a shaded portion of FIG. 10) exceeding 0.4 μm is inverted, the distribution of offset for all magnetic heads 20A to 20D will become a characteristic 80. Since this value of 0.4 μm corresponds to 2 sigmas of a process fluctuation, it becomes 2 sigmas conventionally for, for example, a magnetic head exceeding a design value by 0.4 μm. However, if, as in the embodiment of the present invention, the direction (polarity) of the bias current is changed for each magnetic head, the value of 0.4 μm becomes 4 sigmas. Accordingly, distribution of a off-track can be concentrated to an optimum value.

The time that the direction (polarity) of the bias current applied to each magnetic head is changed can also be set by measuring the distribution of the track position of the recording element and the reproduction element for each disk, after the HDD 10 has been formed. Alternatively, the time can also be set to a set value specified at manufacture.

As described above, the polarity of the bias current applied to an MR element of a hard-disk drive (HDD) having a rotary actuator and being of a sector servo system is changed with the aid of the reproduction elements with an MR effect, so that off-track at reproduction of a sector number can be reduced by bringing the effective sensitivity positions near to recording elements. Therefore, the displacement of the track position of the reproduction element and the recording element can be reduced, so track misregistration (TMR) can be reduced.

While, in the aforementioned embodiment, the bias magnetic field has been applied to the MR element by a soft bias, the present invention is not limited to this. For example, the bias magnetic field may also be applied to the MR element by a shunt bias in which a magnetic field is applied by disposing a conducting body in the vicinity of an MR element and supplying a current to the conducting body.

Although, in the aforementioned embodiment, the polarity of the bias current supplied to the MR element has been changed, then the direction of the bias magnetic field has been inverted, the present invention is not limited to this. The bias current supplied to the MR element may also be changed consecutively.

Also, while, in the aforementioned embodiment, the magnetic head has been positioned by a sector servo method, the present invention is also applicable to a head positioning method of the nonsector type in which sector regions are not formed on the disk. In such case, the amount of microjogging is different at the inner circumference, the radial intermediate, and the outer circumference of the disk. However, in the aforementioned embodiment, the displacement of the track position of the reproduction element and the recording element can be reduced, so the amount of microjogging can be reduced.

As described hereinbefore, the present invention has the advantages that the position at which the magnetoresistive effect becomes most sensitive moves according to the displacement of the reproduction element to the track and the accuracy of reproduction is enhanced, because the direction of the magnetic field applied to the reproduction element is changed according to the relative position between the track and the reproduction element.

In addition, since the position at which the sensitivity of the magnetoresistive effect becomes most sensitive can be moved in accordance with the displacement of the reproduction element to the track by changing the direction of the magnetic field applied to the reproduction element, it is not necessary to form a wider track in which reproduction error is taken into consideration. Accordingly, a region for reproducing information can be formed with a narrow track width, so recording density can be enhanced.

What is claimed is:

1. A method for serving using a magnetoresistive head which further comprises a reproduction element having a magnetoresistive effect and for reproducing information with a bias magnetic field applied to said element and with said magnetoresistive effect, and a recording element for recording said information, said method comprising the steps of:

positioning said reproduction element over a selected track on a recording disk having a plurality of tracks; and changing the direction of said bias magnetic field applied to said reproduction element in response to the skew angle between said track and said reproduction element.

2. The servo method of claim 1 wherein the tracks on said recording disk are at different radial positions and wherein said step of changing the direction of said bias magnetic field occurs when moving from one of said tracks to another of said tracks of said plurality of tracks.

3. The servo method of claim 2 wherein the step of changing the direction of said bias magnetic field occurs when moving from one of said tracks to another of said tracks in accordance with the radial position of said one track and said another of said tracks.

4. The servo method of claim 3 wherein moving from one track to another of said tracks occurs along an arcuate path.

5. The servo method of claim 4 wherein changing the bias magnetic field to said magnetoresistive effect element occurs at a selected position along said arcuate path.

6. The servo method of claim 1 wherein the step of changing the direction of said bias magnetic field applied to said reproduction element further comprises:

determining a first magnetic field direction corresponding to a predetermined reference position relationship between said track and said reproduction element; and determining a second magnetic field direction different from said first magnetic field direction and corresponding to a predetermined position relationship different from said reference position relationship; and changing between a first magnetic field direction and a second magnetic field direction.

7. The servo method of claim 1 wherein a bias current is supplied to apply a bias magnetic field to said reproduction element, wherein the step of changing the direction of the bias magnetic field further comprises the step of changing the polarity of said bias current.

8. A hard-disk system comprising:

an information recording disk having tracks with servo information areas and information reproduction regions;

a magnetoresistive head including a reproduction element having a magnetoresistive effect and for reproducing information with a bias magnetic field applied to said element and with said magnetoresistive effect, and a recording element for recording said information;

a positioning means for, when said information is reproduced from an information recording disk having tracks with a plurality of information record reproduction regions, positioning said reproduction element over a corresponding track; and a magnetic field direction change means for changing the direction of said bias magnetic field applied to said reproduction element, in response to the skew angle between said track and said reproduction element.

9. The hard-disk system of claim 8, wherein said magnetic field direction change means includes:

means for determining a first magnetic field direction corresponding to a first predetermined reference position relationship between said track and said reproduction element; and means for determining a second magnetic field direction different from said first magnetic field direction, and corresponding to a second predetermined position relationship different from said first reference position relationship.

10. The hard-disk system of claim 8, further comprising:

a bias current supply means for supplying a bias current to apply a bias magnetic field to said reproduction element, wherein said magnetic field direction change means changes said direction of said bias magnetic field applied to said reproduction element, by changing the polarity of said bias current of said bias current supply means.

11. The hard-disk system of claim 10, wherein said magnetic field change means includes means for changing the direction of said bias magnetic field applied to said reproduction element, between said first magnetic field direction and said second magnetic field direction.

12. The hard-disk system of claim 10, wherein said magnetic field direction change means includes a switch.

13. A hard-disk system comprising:

a magnetoresistive head including a reproduction element having a magnetoresistive effect and for reproducing information with a bias magnetic field applied to said element and with said magnetoresistive effect, and a recording element for recording said information;

a positioning means for, when said information is reproduced from an information recording disk having a plurality of tracks with a plurality of information record reproduction regions arranged in a radial direction, positioning said reproduction element over a corresponding track; and a magnetic field direction change means for changing the direction of said bias magnetic field applied to said reproduction element, in response to the skew angle of said radial direction in which said magnetoresistive head is positioned.

14. The hard-disk system of claim 13, wherein said magnetic field direction change means includes:

means for determining a first magnetic field direction corresponding to a first predetermined reference position relationship between said track and said reproduction element; and means for determining a second magnetic field direction different from said first magnetic field direction, and corresponding to a second predetermined position relationship different from said first reference position relationship.

15. The hard-disk system of claim 14, wherein said magnetic field change means includes means for changing the direction of said bias magnetic field applied to said reproduction element, between said first magnetic field direction and said second magnetic field direction.

16. The hard-disk system of claim 13, further comprising:

a bias current supply means for supplying a bias current to apply a bias magnetic field to said reproduction element, wherein said magnetic field direction change means changes said direction of said bias magnetic field applied to said reproduction element, by changing the polarity of said bias current of said bias current supply means.

17. The hard-disk system of claim 16, wherein said magnetic field direction change means includes a switch.

18. A disk drive system comprising:

a disk for storing data and servo information;

an arm, further comprising:

a head including an MR element for reproducing data and servo information, and an element for recording data, said head attached to said arm; and means for moving said arm to selected locations with respect to the disk;

means for changing the bias to the MR element to change the portion of the head which can read data and servo information; and a controller for controlling the movement of the arm and controlling means for changing the bias on the MR element attached to said arm, said controller changing the bias on the MR element responsive to the skew angle of the arm.

19. The drive system of claim 18 further comprising means for detecting the position of the head and arm with respect to the disk.

* * * * *